United States Patent
Geisselmann

(10) Patent No.: US 9,644,686 B2
(45) Date of Patent: May 9, 2017

(54) MODULAR INTERFACE ARRANGEMENT FOR TOOLS

(71) Applicant: BENZ GmbH Werkzeugsysteme, Haslach (DE)

(72) Inventor: Thomas Geisselmann, Fischerbach (DE)

(73) Assignee: BENZ GMBH WERKZEUGSYSTEME, Haslach (DE)

( * ) Notice: Subject to any disclaimer, the term of this patent is extended or adjusted under 35 U.S.C. 154(b) by 607 days.

(21) Appl. No.: 13/731,198

(22) Filed: Dec. 31, 2012

(65) Prior Publication Data

US 2013/0129414 A1 May 23, 2013

Related U.S. Application Data

(63) Continuation-in-part of application No. PCT/DE2011/001572, filed on Jul. 5, 2011.

(30) Foreign Application Priority Data

Jul. 5, 2010 (DE) .................. 10 2010 026 129

(51) Int. Cl.
  *B23B 31/113* (2006.01)
  *F16D 1/108* (2006.01)
  *B23B 31/00* (2006.01)

(52) U.S. Cl.
  CPC ............ *F16D 1/108* (2013.01); *B23B 31/003* (2013.01); *B23B 31/113* (2013.01); *B23B 2231/12* (2013.01); *B23B 2231/52* (2013.01); *Y10T 279/17888* (2015.01); *Y10T 403/595* (2015.01); *Y10T 408/95* (2015.01); *Y10T 409/30952* (2015.01); *Y10T 409/309408* (2015.01)

(58) Field of Classification Search
  CPC ............... B23B 31/113; B23B 2231/12; B23B 2231/52; B23B 31/003; Y10T 403/595; Y10T 409/30952; Y10T 409/309408; Y10T 279/17888; F16D 1/108
  See application file for complete search history.

(56) References Cited

U.S. PATENT DOCUMENTS 3,444,781 A * 5/1969 Hilliard et al. .................. 407/45
3,759,536 A * 9/1973 Bronzini ................. B23B 29/10
  279/103

(Continued)

FOREIGN PATENT DOCUMENTS

CH   679286 A5 * 1/1992
DE   1948452 A1 * 4/1971
FR   2611554 A1 * 9/1988

Primary Examiner — Eric A Gates
Assistant Examiner — Paul M Janeski
(74) Attorney, Agent, or Firm — Klaus J. Bach

(57) ABSTRACT

In an interface arrangement between a first component group supporting a tool holder and a second component group supporting a machining element in a central opening for releasably accommodating the first component group, a shift lever element provided with engagement members is disposed rotatably on the second component group and provided with engagement and release elements for releasably retaining the first component group in the central opening of the second component group so as to permit a rapid exchange of the first component group by another group with a new tool.

8 Claims, 5 Drawing Sheets

(56) References Cited

U.S. PATENT DOCUMENTS

| | | | | |
|---|---|---|---|---|
| 4,655,631 | A * | 4/1987 | Mitchell | 403/349 |
| 6,974,287 | B2 * | 12/2005 | Neumeier | 409/232 |
| 8,360,699 | B2 * | 1/2013 | Stojanovski | 409/232 |
| 2003/0164597 | A1 * | 9/2003 | Kimura | B23B 31/06 279/89 |
| 2006/0140736 | A1 * | 6/2006 | Kress | B23B 31/102 409/234 |

* cited by examiner

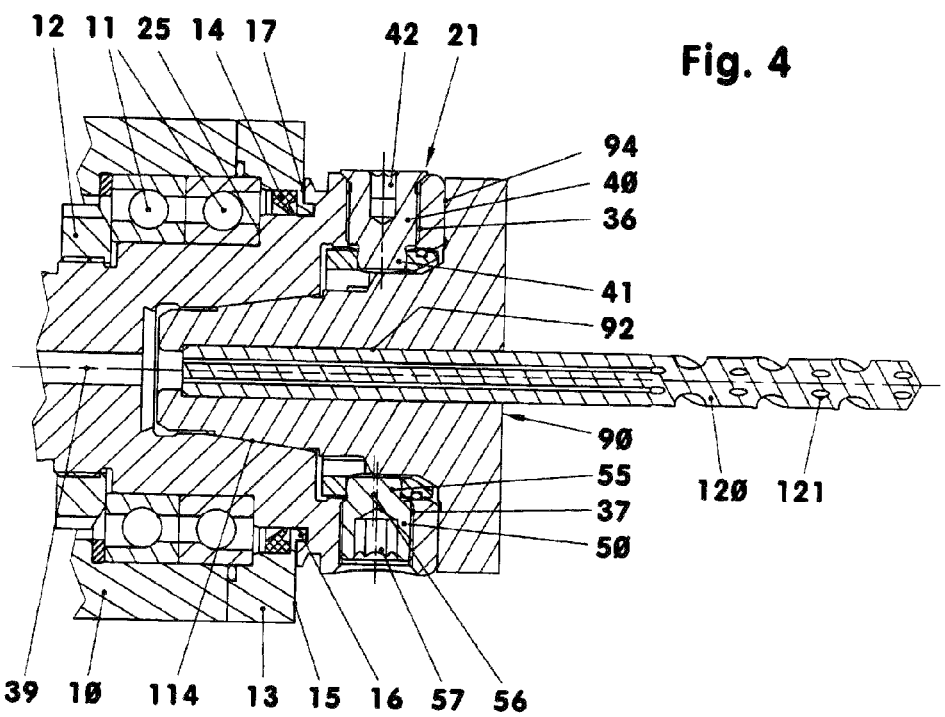
Fig. 4
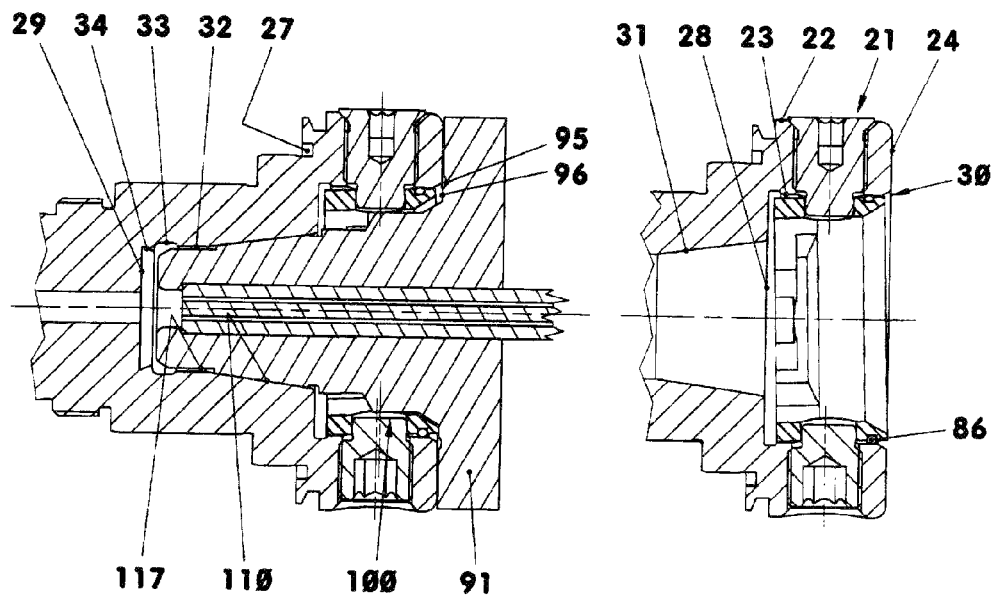
Fig. 5
Fig. 6

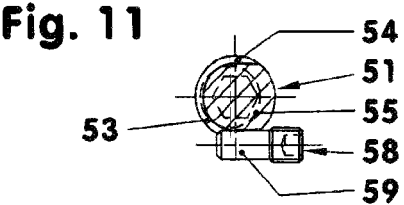
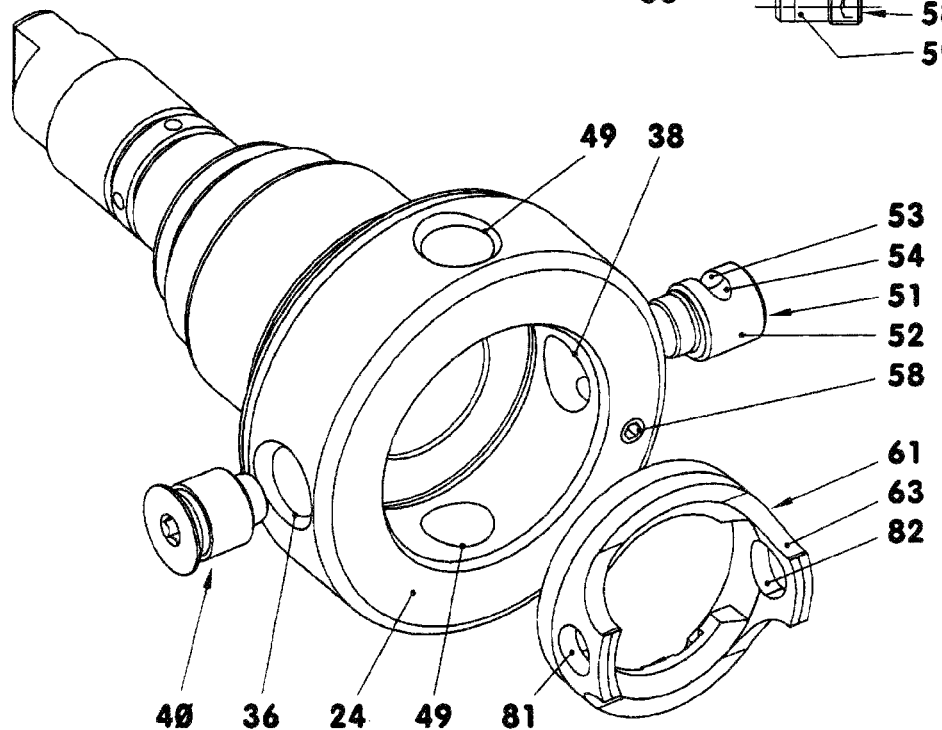
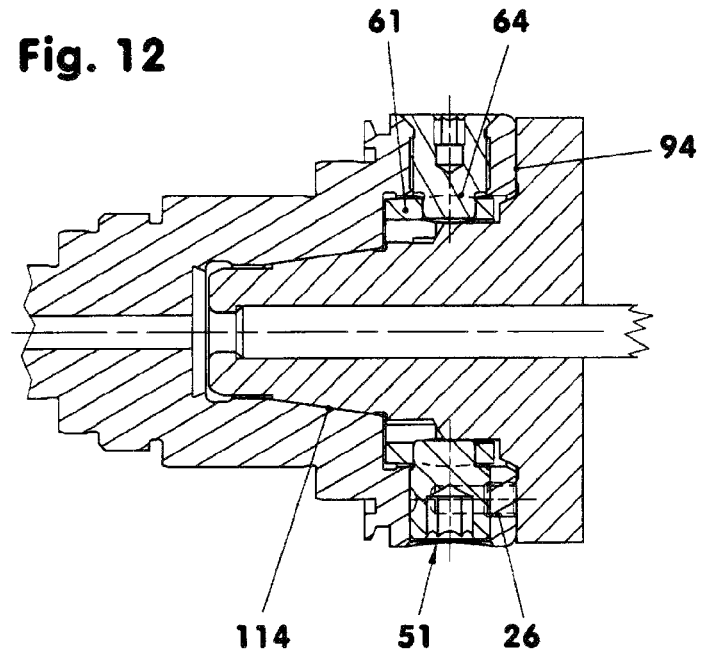
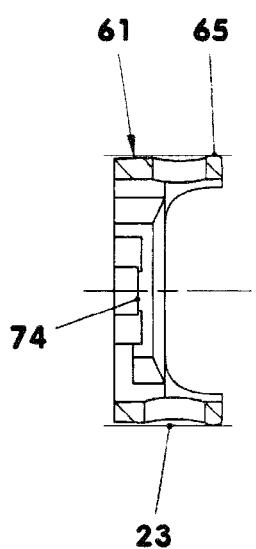

MODULAR INTERFACE ARRANGEMENT FOR TOOLS

This is a Continuation-In-Part application of pending international patent application PCT/DE2011/001572 filed Sep. 21, 2011 and claiming the priority of German patent application 10 2010 026 129.7 filed Jul. 5, 2010.

BACKGROUND OF THE INVENTION

The invention resides in an interface arrangement between a first component group supporting a tool or a tool holder and a second component group supporting an element to be machined. The first component group has a cavity having a truncated cone-shaped section and a support or contact surface which is directed toward the second component group and the second component group has on one hand a cone or truncated cone-shaped section for abutting the cam-shaped cavity of that first component group and, furthermore a contact area which is oriented in axial direction for contacting the support surface or contact area of the first component group.

EP 1 768 808 B1 discloses a tool adapter for the releasable mounting of a tool carrier of a machine tool. The tool adapter consists among others of a conical section and a cylindrical collar. In the cylindrical collar, there are two oppositely arranged transverse bores into which the clamping bolts are screwed which extend into the tool carrier and which have truncated cone-shaped tips. As the bolts are threaded into the transverse bores, the tool adapter is clamped against the cylindrical collar. During an exchange of the tool adapter however tensions may occur since the clamping bolts can be tightened only one after the other. For a change of the tool adapter furthermore the two clamping bolts must be unscrewed to such an extent that they fall out of their seat.

It is the object of the present invention to provide an interface arrangement of a first component group and a second component group which with each tool change provides for a simple procedure with high repetition accuracy regarding the position of the second component group in relation to the first component group.

SUMMARY OF THE INVENTION

In an interface arrangement between a first component group supporting a tool holder and a second component group supporting a machining element having a recess for releasably accommodating the first component group, a lever element provided with engagement means is disposed rotatably on the second component group and provided with engagement and release means for releasably retaining the first component group in the recess of the second component group so as to permit a rapid exchange of the first component group by another group with a new tool.

An arrangement is also possible wherein the engagement or contact areas are not purely axial surface areas.

In accordance with the invention, a second component group is positioned opposite a first group so that it cannot be rotated and can be engaged in a simple and accurately repeatable manner. To this end, between the two component groups as interface element a shift lever element is installed. The shift lever element is supported by the first component group so as to be pivotable and/or longitudinally slidable. As anchoring elements for the second component group, it has for example several internal webs. The second component group has corresponding web-like engagement elements which, upon insertion of the second component group reach behind the anchor element of shift lever element. The engagement of the anchor elements by the engagement elements can be compared with the engagement of a conventional bayonet lock.

In the embodiments, the first component group is a rotating spindle head of a tool change aggregate. The second component group represents a tool supporting tool holder. Of course, the first component group may also be a non-rotating tool carrier as it is used a cutter holder of an overhead carriage of a conventional lathe. In this case, the second component group is a cutting tool arranged in a tool holder or a cutter carrier.

The invention will become more readily apparent from the following description of exemplary embodiments.

BRIEF DESCRIPTION OF THE DRAWINGS

FIG. 4 is a longitudinal cross-sectional view of FIG. 1, FIG. 5 is a partial cross-sectional view of FIG. 1 with the mounting gaps vented, FIG. 6 shows the arrangement of FIG. 5 without the tool holder, FIG. 10 shows another interface area without housing tool holder or tool in an exploded view, FIG. 11 is a cross-sectional view of the eccentric shaft with pivot stop pins, FIG. 12 shows in a partial longitudinal cross-sectional view the arrangement of FIG. 10 including the tool holder, and FIG. 13 is an axial cross-sectional view of the modified shift element of FIG. 11.

DESCRIPTION OF A PREFERRED EMBODIMENT OF THE INVENTION

Figure 1:
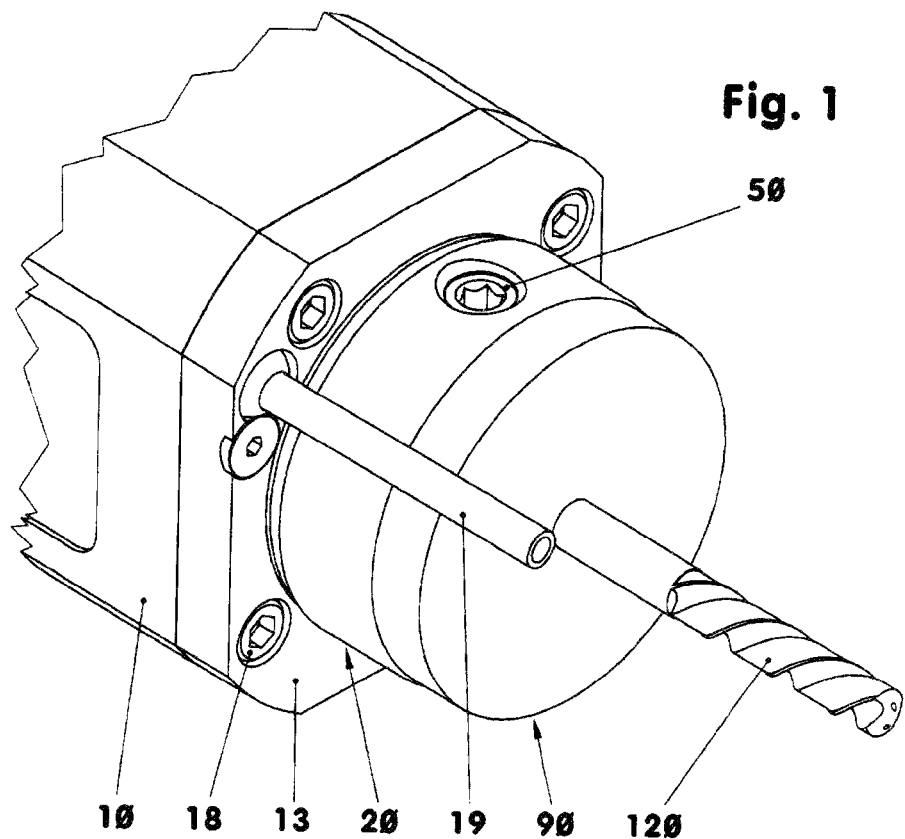
FIG. 1 shows in a perspective view an interface arrangement comprising a spindle head and a tool holder, FIG. 2 shown in a rear view a shift lever element.

FIG. 1 shows the front part of a tool assembly. It includes a spindle head 20, which projects from the housing 10 and represents the first component group of a modular interface location. In the spindle head 20, an exchangeable tool holder 90 is disposed as the second coassembly component of the modular interface area. The tool holder 90 carries the tool 120 which is for example a spiral drill bit with internal cooling. It is provided with an end piece 19 of an external coolant-lubrication medium supplying line which is pivotally supported in a front cover 13 of the housing 10.

As shown in FIG. 4, the housing 10 and the cover 13 support the front end of the spindle head 2 by two axial ball bearings 11 arranged side-by-side. The outer rings of the axial ball bearings 11 are axially fixed between the housing 10 and the cover 13. The inner rings of the bearings 11 which are supported on the spindle head 20 are axially engaged between a spindle head shoulder 25 and a shaft unit 12 threaded onto the spindle head 20

The cover 13 of the housing 10 is provided at its front end of its essentially planar front face 15 with a web 16 which extends axially into a corresponding collar groove 27 of the spindle head 20, see FIG. 5. Between the web 16 and the collar groove 27 as well as between the front face 15 and the opposite front face of the spindle head 20 there is a labyrinth joint 17 which has a gap width of for example 01-02 mm. Behind the labyrinth seal, a lip seal 14 is arranged whose lip which is in contact with the spindle head 20 and faces toward the labyrinth seal.

At the front of the spindle head 20, a tubular clamping drive section 21 projects from the housing 10. This clamping drive section 21, see FIG. 6, has for example a cylindrical outer wall 22, a cylindrical inner wall 23 as part of a central opening 30 accommodating a tool holder 90—and a for example planar front face 24. The depth of the clamping drive section 21 in a spindle head 20 of for example 64 mm outer diameter is 20 mm whereas its wall thickness is for example 12 mm. The inner wall ends for example ahead of a planar inner front face area 28 from which a truncated cone-shaped section 31 extends inwardly. This section 31 has in the present embodiment for example a maximum diameter of 25 mm and a cone angle of 16 angular degrees. The length of this truncated cone-shaped section 31 is about 18 mm.

Adjacent the truncated cone-shaped section 31, there is a bore 32 which is cylindrical at least over part thereof. It ends ahead of a further inner front face area 29 to which a cooling- and/or lubricant admission bore 39 extends. Ahead of the inner front surface 29, the bore 32 ends in a truncated cone-shaped axial recess 34. The largest diameter of this recess 34 is in the area of the inner front face 29. In this widened recess 34 a seal may be placed which seals the bores 39, 92 relative to each other.

Between the recess 34 and the cylindrical part of the bore 32, there is a cylindrical widened section 33. Its maximum diameter is for example 1 mm greater than that of the bore 32.

The clamping drive section 21 of the spindle head 20 includes for example two oppositely arranged threaded bores 36, 37. As shown in FIG. 4, the two threaded bores 36, 37 may have the same fine thread, for example M12 ×1. Into the upper threaded bore 36, a special countersink screw 40 is firmly threaded. The head of this screw 40 firmly abuts the recess of the threaded bore 36. The other end of the special countersunk screw 40 has a rounded, for example a spherically curved, engagement pin 41 which projects into the central opening 30. The diameter of the engagement pin 41 is for example 8 mm. Into the lower threaded bore 37, an eccentric screw 50 is threaded as shown in FIG. 4. It is provided with an eccentric pin 55 which extends into the central opening 30. The eccentric pin has a diameter of for example 9 mm and is provided with a curved, for example, spherically curved front end. The eccentricity of the eccentric pin 55 is for example 0.55±0.2mm. The pivot axis of the eccentric screw 50 is the centerline thereof.

The tool insert opening 42 of the special countersunk screw 40 is smaller than the tool recess 57 of the eccentric screw 50.

As shown in FIG. 4, the tool holder 90 is accommodated in the central opening 30. The tool holder comprises a flange section 91, see FIG. 5, a locking section 100, a cone section 110 and an end section 117, see also FIG. 9. For example, the nearly disc-shaped flange section 91 has in the shown embodiment a cylindrical outer surface area whose outer diameter is slightly smaller than the outer diameter of the adjacent spindle head 20. At its front, the flange section 91 has for example a planar face area in whose center a cylindrical bore 92 is provided for accommodating the tool 120 for example by means of radial engagement fit.

Figure 9:
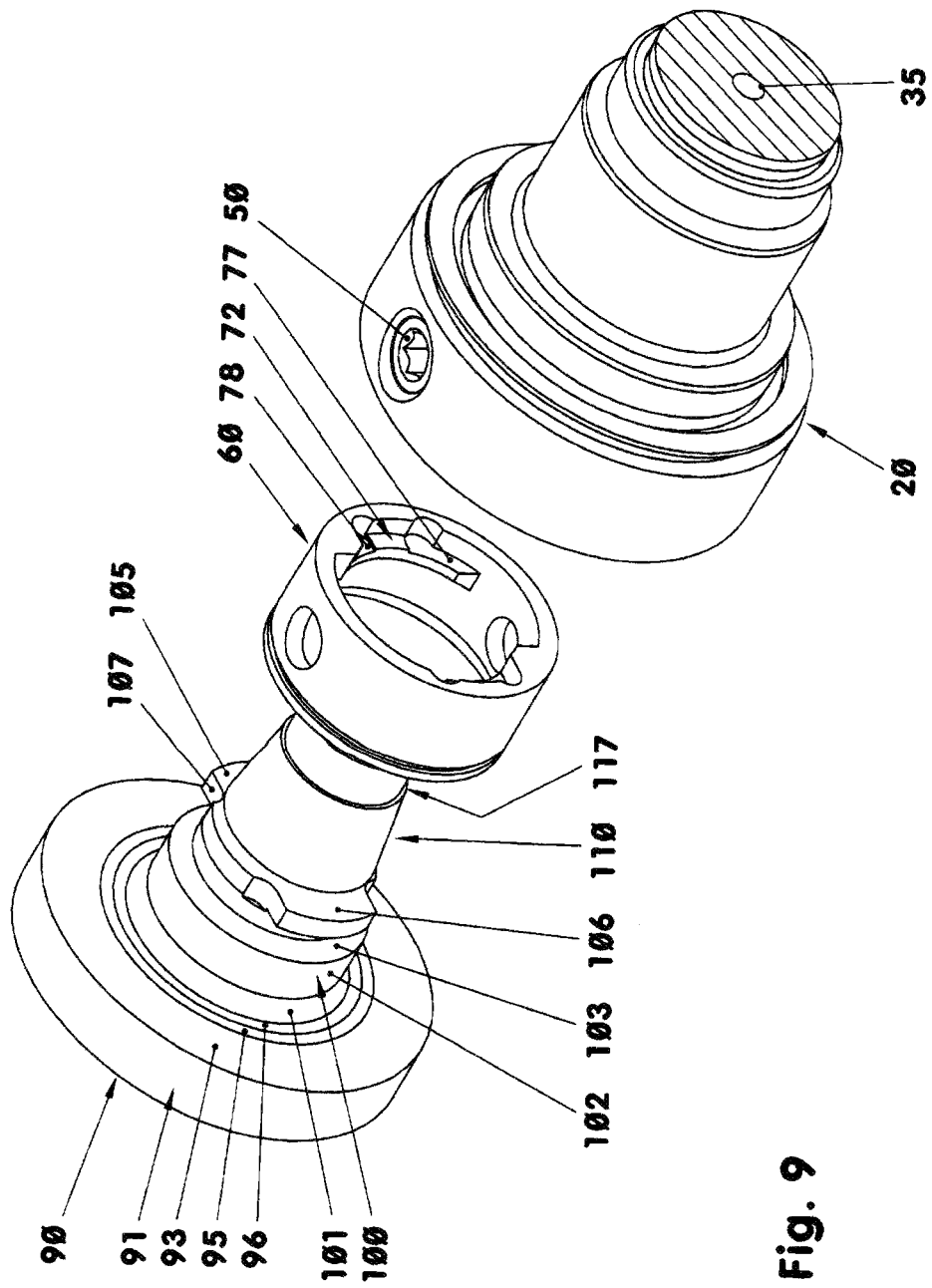
FIG. 9 is an exploded view of the interface area without housing and tools.

The back side of the flange section 91 is provided for example with a planar face area 93 w FIG. 9), which forms a support surface for contact with the spindle head 20. The face area 93 may be divided into different zones by straight or curved grooves. The front surfaces 24 and 93 may be machined to fit together and are cone-shaped or even spherically curved. The cone angle could then he between 170 and 190 angular degrees whereas the radius of curvature of a spherically curved surface would be greater than 200mm.

With respect to the lacking section 100, the front or support surface 93 is separated by a circumferential groove 95. Within the circumferential groove 95, a planar ejection surface 96 is provided. In the area of the ejection surface 96, the flange section 91 has for example a slightly larger wall thickness than in the area of the planar face area 93.

Adjacent the ejection surface 96, there is a 3.3×30° face 101 followed by a short cylindrical section 102, which includes an annular groove 103 with, for example, a cylindrical groove bottom 104. The groove bottom has for example, a diameter of 26.4 mm. At the side of the flange, the annular groove 103 has a truncated cone shape with a flank angle of 30°. The opposite groove flank has for example a planar surface area.

Between the annular groove 103 and the following conical section 110, there are in the exemplary embodiment for example two about 3.5 mm wide engagement webs 105, 106 which extend in circumferential direction each for about 60°. Each engagement web 105, 106 has in the circumferential direction a side flank 107, wherein the side flanks 107 of each engagement web 105, 106 are oriented parallel to each other. They are in the exemplary embodiment spaced from each other by 16 mm. The maximum diameter of the spindle head 20 in the area of the engagement webs 105, 106 is 32.2 mm.

The cylindrical section 102 between the face 101 and the groove bottom 104 may be replaced by a truncated cone sleeve.

Next to the locking section 100 the cone section 40 is disposed. The latter is in a large area in contact with truncated cone-shaped section 31 of the spindle head 20 wherein the tool holder 90 is installed. The contact surface is defined as first mounting joint 114. This mounting joint may also have the form of a cylinder sleeve. In the interface area, there are at the same time the planar face areas 93. The tool holder abuts the front contact area 24 of the spindle head 20 over a large surface area. The contact surface area formed thereby is called second mounting junction 94.

In this case, a contact surface may be in contact with one or several point or line contact areas. The spindle head 20 is for example provided with the planar contact area 24 whereas the flange section 91 of the tool holder 90 has for example a single contact area. Of course, the point contact area may be provided on the spindle, head 20 and the tool holder 90 may be provided with the planar front surface area.

The end section 117 is an essentially cylindrical section which ends with a 1.6×30° face and an adjacent 0.4×60° face. In radial direction, there is between the end section 117 and the bore 32 a radial gap of for example 0.5 mm.

Figure 2:
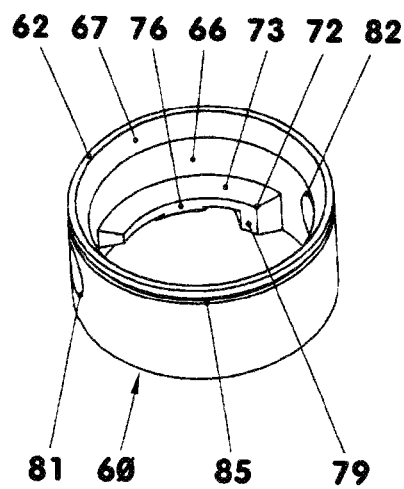

Between the clamping drive section 21 of the spindle head 20 and the locking section 100 of the tool holder 90, there is for example the single part shift lever element 60. The shift lever element 60 is a ring, see FIG. 2, 3, in whose opening 66 in each case two inwardly projecting inner webs 71, 72 are arranged. The radially outer surface of the shift lever element 60 has a cylindrical shape. In the front area, that is the area which is oriented toward the tool holder, an annular groove 85 is machined into the outer surface for accommodating an O-ring 86. The shift lever element 60 has there a planar or a truncated cone-shaped front face area 62. The cone angle is for example 356°.

At the front end, the opening 50 in provided with a 3.6×30° face (67) in the rear area of the opening (60) the inner webs 71, 72 are arranged so as to extend parallel to the shift element center line 89. The front flanks (73) of the inner webs 71, 72 are truncated cone shaped surface areas. The cone angle here is 120°. The radially inner surfaces 76 are for example cylindrically curved. In the area of the inner webs 71, 72, the shift lever element 60 has a diameter of for example 13.5 mm.

Figure 3:
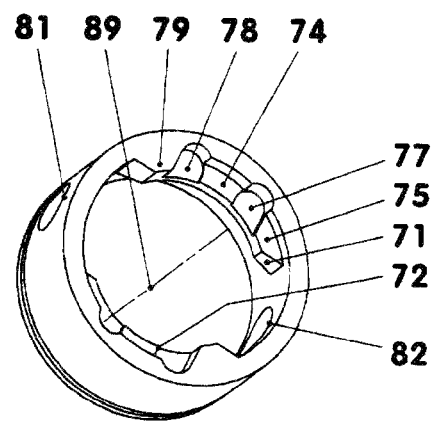
FIG. 3 shows the shift lever element in a front view.

The backsides of the inner webs 71, 72, see FIGS. 3 and 9, have in the middle a planar or slightly cylindrically curved contact surface 74. With a planar contact surface 74, the plane thereof extends normal to the center line 89 of the shift or element 60.

With the cylindrically curved contact surface 74, the centerline of the cylinder curvature intersects the centerline 89 of the shift lever element 60 at a right angle. As shown in FIG. 6, the curvature radius of the contact surface is for example 18 mm. The contact surface 74 may also be a spatial surface area curved in at least two directions wherein the contact surface 74 is reduced to a point of contact.

In the circumferential directions next to each contact surface 74 a free surface 77, 78 is provided which as measured in the direction of the center line 89 is disposed in each case about 0.5 mm behind the contact surface 74. As shown in FIG. 9, the lower, or respectively, front free surface 77 of the inner web 72 is open to the front whereas the upper or respectively rear free surface 78 is provided with a stop by a widening of the web (FIG. 3). The widened web area 79 extends to the rear face area of the shift lever element 60.

As shown in FIG. 3 at the front surface area 77 of the inner web 71, a relatively low web widening 75 is provided which is present only at this inner web 71 and which does not form an obstacle during insertion of the tool holder 90. It serves as a stop during counterclockwise rotation of the spindle head 20 with the interface coupled.

The shift lever element 60 has two transverse bores 81, 82. The two transverse bores 81, 82 are displaced angularly with regard to the centers of the inner webs by 90°. As shown in FIG. 3, the transverse bore 82 shown at right has a diameter of about 9 mm whereas the transverse bore 81 shown at the left has a diameter of about 8 mm. If appropriate, the transverse bores 81, 82 whose inner walls may be arched or conically curved may also be openings of non-circular cross-section.

After installation, the shift lever element 60 is so arranged in the space between clamping drive section 21 and locking section 100 that the engagement pin 41 of the special countersunk screw 40 extends into the transverse bore 81 whereas the eccentric pin 55 of the eccentric screw 50 extends into the larger transverse bore 82, see FIG. 4. The pins 41, 55 are disposed each in the respective transverse bores 81, 82 each with minimal play. A transition fit is also possible.

As shown in FIG. 4, the eccentric screw 50 is exactly so positioned that the centerline 55 of the eccentric pin 55 is disposed at the left of the center line of the eccentric screw 50 adjusted to the largest distance. In this case, the centerline 89 of the shift lever element 60 coincides at least approximately with the center line 39 of the spindle head 20. They may be for example displaced by a few tenths of a millimeter.

Figure 7:
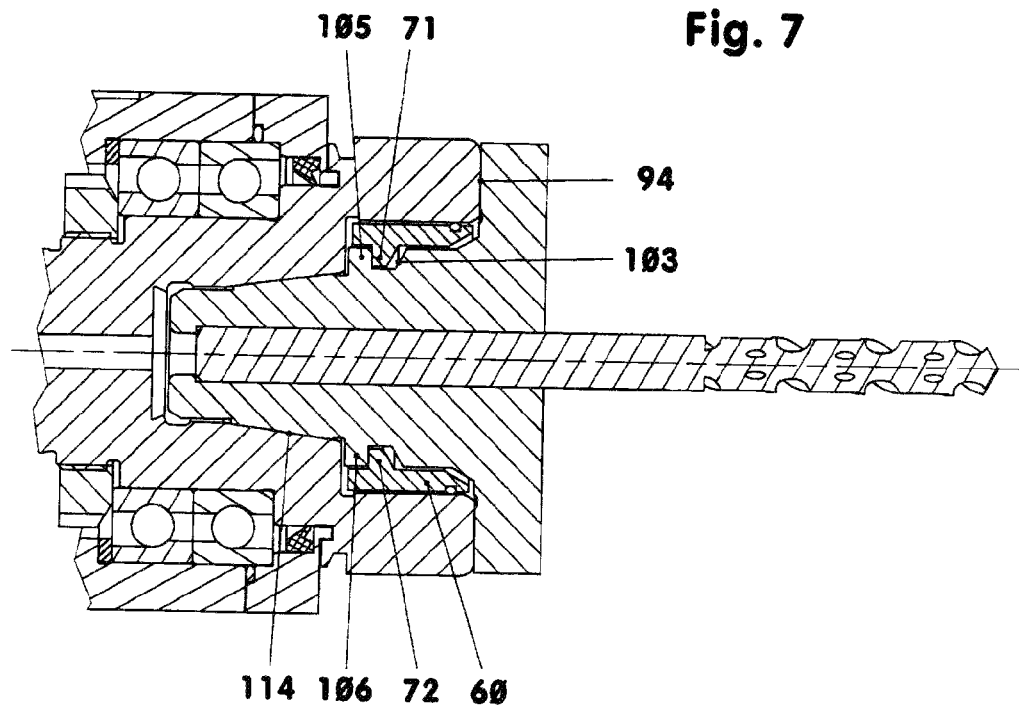
FIG. 7 is a longitudinal cross-sectional view of FIG. 1 turned however by 90° clockwise with respect to the longitudinal sectional views of FIG. 4.

In this state, the spindle head 20 and the tool holder 90 came into contact with each other at the mounting junctions 94 and 114. At the same time, the engagement webs 105, 106 of the tool holder come into contact with the contact surfaces 74 of the inner webs 71, 72, see FIG. 7. The tool holder 50 is engaged in the spindle head 20 accurately without play and in repeatable manner.

Figure 8:
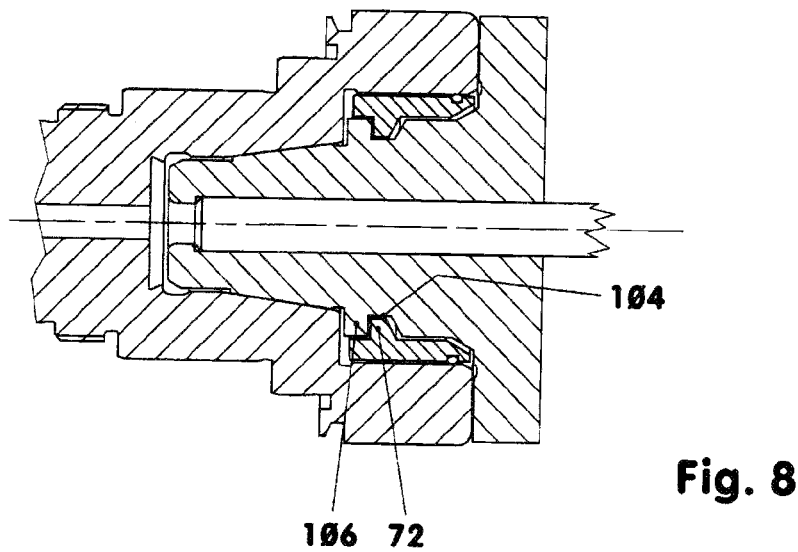
FIG. 8 is a view similar to FIG. 7 but with the mounting joints vented.

When now for releasing the tool holder 90, the eccentric screw 50 is unscrewed for example by half of a left turn, see FIGS. 5, 6 and 8, the shift lever element 60 is pivoted around the fictive center point of the spherical engagement pin 41—in an anticlockwise sense. When in this way the centerline 55 of the eccentric pin 55 is displaced by for example by 1.1 mm toward the right, the contact surfaces 74 are lifted of the engagement webs 105, 106 by 0.55 mm, see FIG. 8. At the same time, the front face area 62 of the sift lever element 68 comes into contact with the ejection surface 96 of the tool holder 90 in order to move the latter out of the mounting junctions 94 and 114, see, FIG. 5. Now the tool holder 90 can be rotated by 90° and then be pulled out of the spindle head 20.

The installation of the tool holder into the spindle head 20 is performed in the reverse order: the tool holder 90 is inserted into the spindle head 20 in such a way that the engagement webs 105, 106 move through the space between the inner webs 71, 72 and behind the inner webs. Then the tool holder is 90 is turned by about 90 degrees to the right. It is now held in the recess 30 with play but safely. Then the eccentric screw 50 is turned clockwise by about half a turn. In the process, the two contact surfaces 74 abut the engagement webs 105, 106 and uniformly pull in the tool holder to tighten the junctions 94 and 114. The tool holder is now engaged in the spindle head without play. The O-ring 86 disposed in the annular groove 85 of the shift lever ring 60 centers the shift lever ring 60 elastically in tee inner wall 23 of the spindle head 20.

FIGS. 10-13 show another variant. Herein, on one hand instead of the eccentric screw 50, an eccentric shaft 51 is used. On the other hand, the relatively rigid shift lever element 60 is replaced by a variant which is more elastic as a result of the material used for its manufacture and/or by design features.

Instead of a fine thread, the eccentric shaft 51 has a smooth cylindrical outer surface 52 which is disposed in an also smooth-walled transverse bore 38 with little play or with a transition fit. A partial annular groove 53 is machined into the center area of the outer surface 52. As shown in FIG. 11, the partial groove extends completely over the left half of the cross-sectional area. In the right-hand cross-sectional half, the tangential partial annular groove end tracks 54 are shown. The center lines of the groove bottoms of the partial annular groove end tracks 54 extend parallel along a straight line if the partial annular groove 53 extends 180° around the eccentric shaft circumference. In the exemplary embodiment, it is 185°. That is, the straight center lines of the groove end tracks extend at an angle of 5°.

The partial annular groove 53 has in the right cross-sectional half a circle section-shaped cross-section. The diameter of the circle representative of this cross-section is for example 4.2 mm. The height of the circle section-shaped cross-section is for example one fourth of the circle diameter.

In order to safely retain the eccentric shaft 51 in the spindle head 20 and, at the same time, to limit the pivot range of the eccentric shaft 51, a threaded longitudinal bore 26 is provided in the front area 24 of the spindle head 20 into which a pivot stop pin 58 is threaded, see FIGS. 10, 11. The longitudinal, bore 26 intersects the transverse bore 38, see FIG. 10, exactly in such a way that the projection 59 of the pin 58 extends into the partial annular groove 53 of the eccentric shaft 51, see also FIG. 11. The diameter of the projection 59 is for example slightly smaller than 4.2 mm.

In the shift lever element 61 of the FIGS. 10 to 13, in comparison with that of FIGS. 1 to 9, the two areas in front of the engagement webs 71, 72 and between the transverse bores 81, 82 are omitted, see. FIG. 13. In the areas of the transverse bores 81, 82, extensions 63 remain however. In this way, the shift lever element 61 becomes more torsion and bending resilient in the area of the inner webs 71, 72 over a certain circumference. The shift lever element 61 obtains in this way the function of an elastic annular spring. For fixing the tool holder 90 in the spindle head 20, the eccentric shaft 51 is pivoted around the 185 annular degrees of the partial annular groove 53. Since the eccentric shaft 51 is pivoted about 5° over the front center point, the respective partial groove end track 54 engages the projection 59 in a pre-tensioned manner thereby securing the projection.

During the pivot movement, the contact surfaces 74 of the shift lever element 61 abut the engagement webs 105, 106 of the tool holder 90 already after 135±15 degrees in a play-free manner. Upon further pivoting the remaining angle is 45±15 angular degrees the shift element 61 is elastically engaged.

In this way, a certain manufacturing tolerance of the interface area is acceptable. With the elasticity of the shift lever element 61, there is always a certain minimal necessary clamping force present in the component Junction 94 and 114. At the same time, the maximum clamping force is limited by the elasticity.

In accordance with FIG. 12, the shift lever element 61 is alternatively curved in the area of the projection 63, see the dashed line spherical contour 64. The curvature of the curve contour 64 corresponds to the inner diameter of the inner wall 23 of the clamping drive section 21. In this way, the shift lever element 61 centers itself via the projections 63 in the clamping drive section 21 along the centerlines of the transverse bores 81, 82. During the rotation of the eccentric shaft 51, the projections 63 are bent inwardly elastically for a short period.

As shown in FIG. 13, instead of a central curved contour 64, a small spherically curved clamping web 65 may be used for the centering. It is arranged in each case at the front end of the projections 63. Also, the clamping web 65 results in an elastic clamping of the projections 63 when the mounting junctions 94 and 114 are vented.

The spindle head 20 according to FIG. 10 includes in each case a further threaded bore 49 arranged between the threaded bore 36 and the transverse bore 38. The latter has for example in each case the same geometric shape as the threaded bore 36.

Instead of an eccentric screw 50, an eccentric shaft. 51 and a special, countersunk screw 40, also two eccentric screws 50 or two eccentric shafts 51 may be used. In these cases, the overall stroke of the shift lever element 60 61 is doubled.

REFERENCE NUMERAL LISTING

10 Housing
11 Axial bearings
12 Shaft nut
13 Cover
14 Lip seal
15 Front face
16 Web
17 Labyrinth gap/seal
18 Cover screw
19 End piece
20 Spindle head
21 Clamping drive section
22 Cylinder outer wall
23 Cylinder inner wall
24 Contact area
25 Spindle head shoulder
26 Longitudinal bore
27 Collar groove
28 Inner front face area front
29 Inner front face area rear
30 Central opening
31 Truncated cone section
32 Bore
33 Cylinder widened section
34 Conical axial recess
35 Lubricant admission bore
36 Threaded bore
37 Threaded bore
38 Transverse bore
39 Center line of the spindle head
40 Countersunk screw
41 Engagement pin
42 Tool insert opening
49 Threaded bore
50 Eccentric screw
51 Eccentric shaft
52 Outer surface
53 Partial annular grooves
54 Partial groove end tracks
55 Eccentric pin
56 Centerline of (55)
57 Tool opening
58 Pivot stop pin
59 Projection
60 Shift lever element
61 Shift lever element with projections
62 Front face cover
63 Projections
64 Curved contour
65 Clamping web
66 Bore opening
67 Fase
71, 72 Inner webs
73 Front flanks
74 Contact surface
75 Widened web
76 Inner surface
77 Front free surface area
78 Rear free surface area
79 Rear widened web area
81 Transverse bore
82 Transverse bore
85 Annular groove
86 O-ring
89 Centerline
90 Tool holder
91 Flange section
92 Bore for tool
92 Contact area
94 Mounting junction planar face area
95 Circumferential groove
96 Ejection surface
100 Locking section 101 Fase
102 Cylinder section
103 Annular groove
105, 106 Engagement webs
107 Side flank
110 Cone section
114 First mounting junction
117 End section
120 Tool
121 Coolant/lubricant channel

What is claimed is:

1. In an interface arrangement formed by a first component group (20) supporting a tool or a tool holder and a second component group (90) carrying a machining element (120),
   the first component group (20) having a central opening (30) with a truncated cone-shaped section (31) with a circular cross-section and contact points or a contact area (24) effective in an axial direction, that is in a direction toward the second component group (90) and
   the second component group (90) having a cone- or truncated cone-shaped section (110) for abutting the truncated cone-shaped section (31) of the first component group (20), and
   at least one contact or engagement area (93) facing in axial direction for contact or engagement with the contact area (24) of the first component group (20),
   the improvement wherein a shift lever element (60, 61) is longitudinally movably or pivotally supported in the central opening (30) of the first component group (20),
   the shift lever element (60, 61) is of an annular shape and has at least two transverse bores (81, 82) and the first component group (20) includes at least two engagement pins (41, 55) extending into the transverse bores (81, 82) for supporting the shift lever element (60, 61) and has linking webs (71, 72) for connecting the second component group (90) to the first component group (20) and
   the second component group (90) includes an engagement element (105, 106) which, by a pivot movement of the second component group (90), engages the linking webs (71, 72) of the shift lever element (60, 61).

2. The interface arrangement according to claim 1, wherein the first component group (20) is a spindle head and the second component group (90) is a tool holder.

3. The interface arrangement according to claim 1, wherein at least one of the engagement pins (41) is firmly mounted to the first component group (20) whereas the other engagement pin (55) is eccentrically and pivotally supported.

4. The interface arrangement according to claim 3, wherein in the first component group, the at least one engagement pin (41) of the first component frame has a centerline which is in axial alignment with the pivot axis of the other engagement pin (55).

5. The interface arrangement according to claim 1, wherein the linking webs (71, 72) of the shift lever element (60, 61) are radially inwardly extending inner webs (71, 72).

6. The interface arrangement according to claim 5, wherein the inner webs (71, 72) have raised contact areas (74).

7. The interface arrangement according to claim 1, wherein the engagement elements (105, 106) of the second component group (90) are radially outwardly projecting engagement webs.

8. An interface arrangement between a first component group (20) supporting a tool or a tool holder and a second component group (90) supporting a machining element,
   the first component group (20) having a central opening (30) which has at least one truncated cone-shaped section (31) with circular cross-section and
   the second component group (90) having a conical or truncated cone-shaped section (110) to be in contact with the truncated cone-shaped section of the first component group (20),
   a shift lever element (60, 61) being disposed in the central opening (30) of the first component group (20) so as to be movable therein in a longitudinal direction and also being pivotable,
   the shift lever element (60, 61) being annular and having at least two transverse bores (81, 82) and the first component group (20) having at least one engagement member (71, 72) with pins (41, 55) extending into the transverse bores (81, 82 for supporting the shift lever element (60, 61) and providing a connection to the second component group (90) and
   the second component group (90) having at least one engagement element (105, 106) which, by a pivot movement of the second component group (90), is engageable with the at least one engagement member (71, 72) of the shift lever element (60, 61).

* * * * *